W. MORRISON.
ELECTRIC SECONDARY BATTERY.
APPLICATION FILED DEC. 27, 1904. RENEWED JUNE 21, 1912.
1,051,816.
Patented Jan. 28, 1913.
4 SHEETS—SHEET 4.
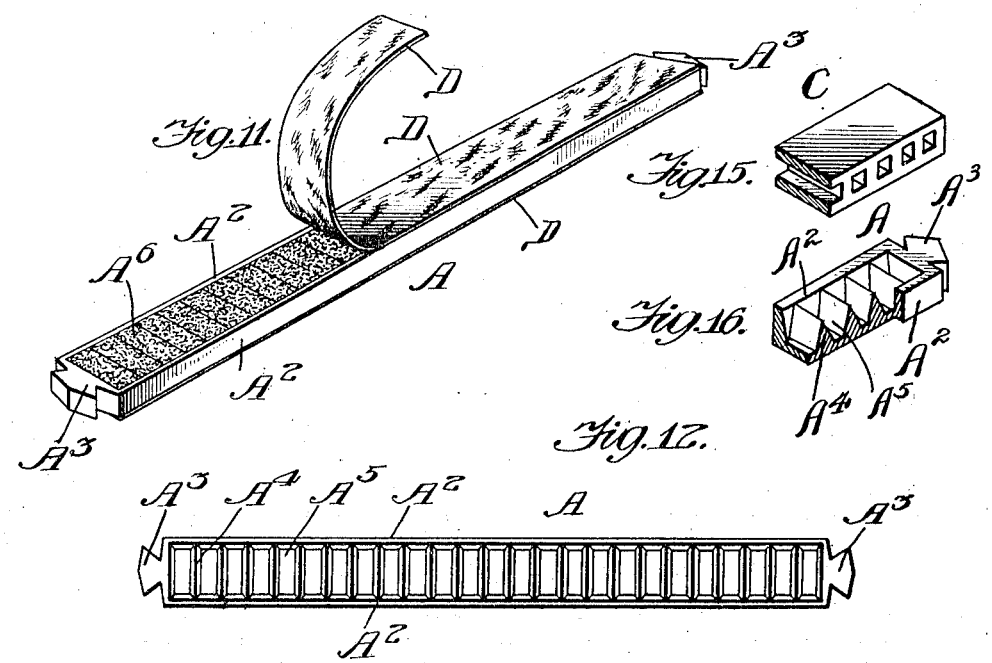
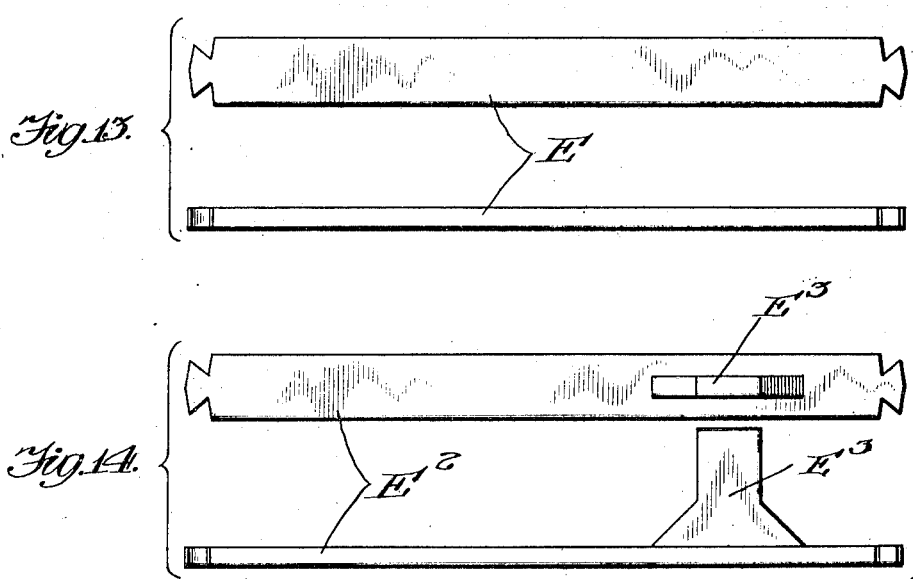

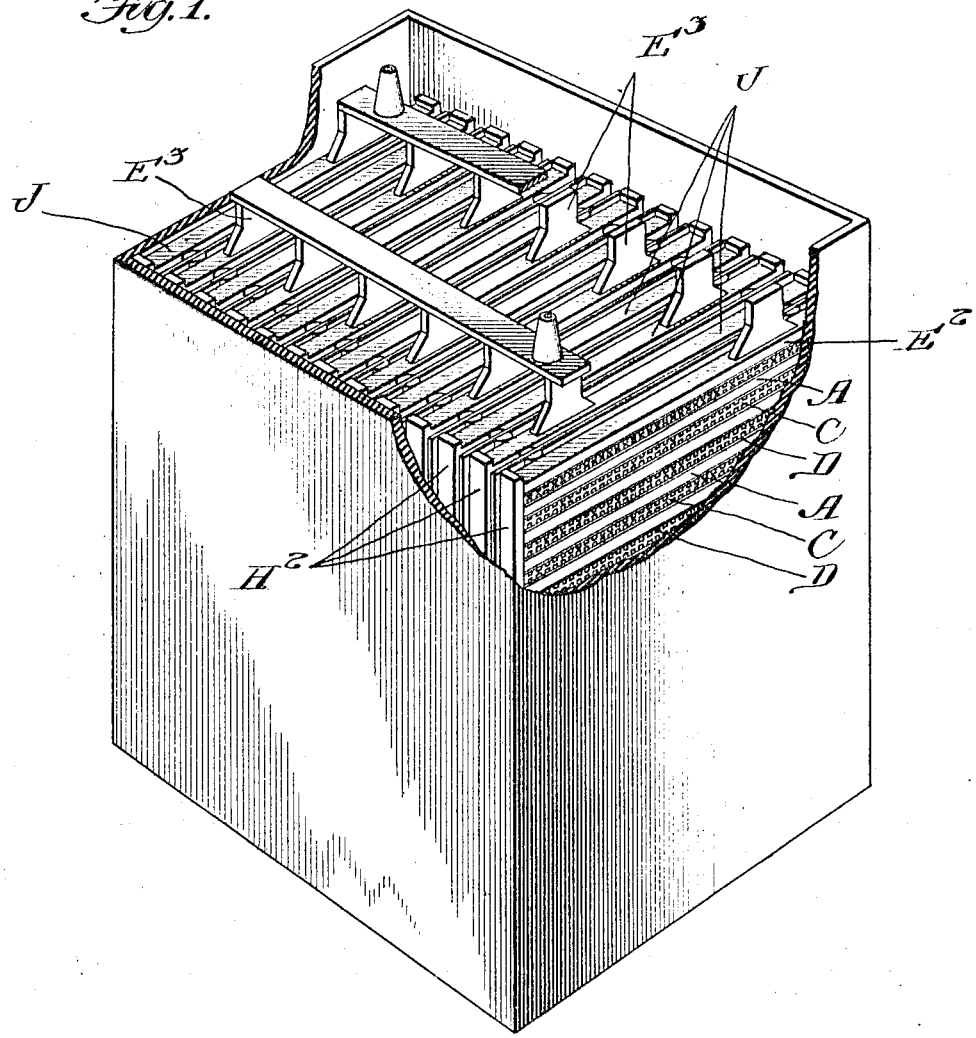

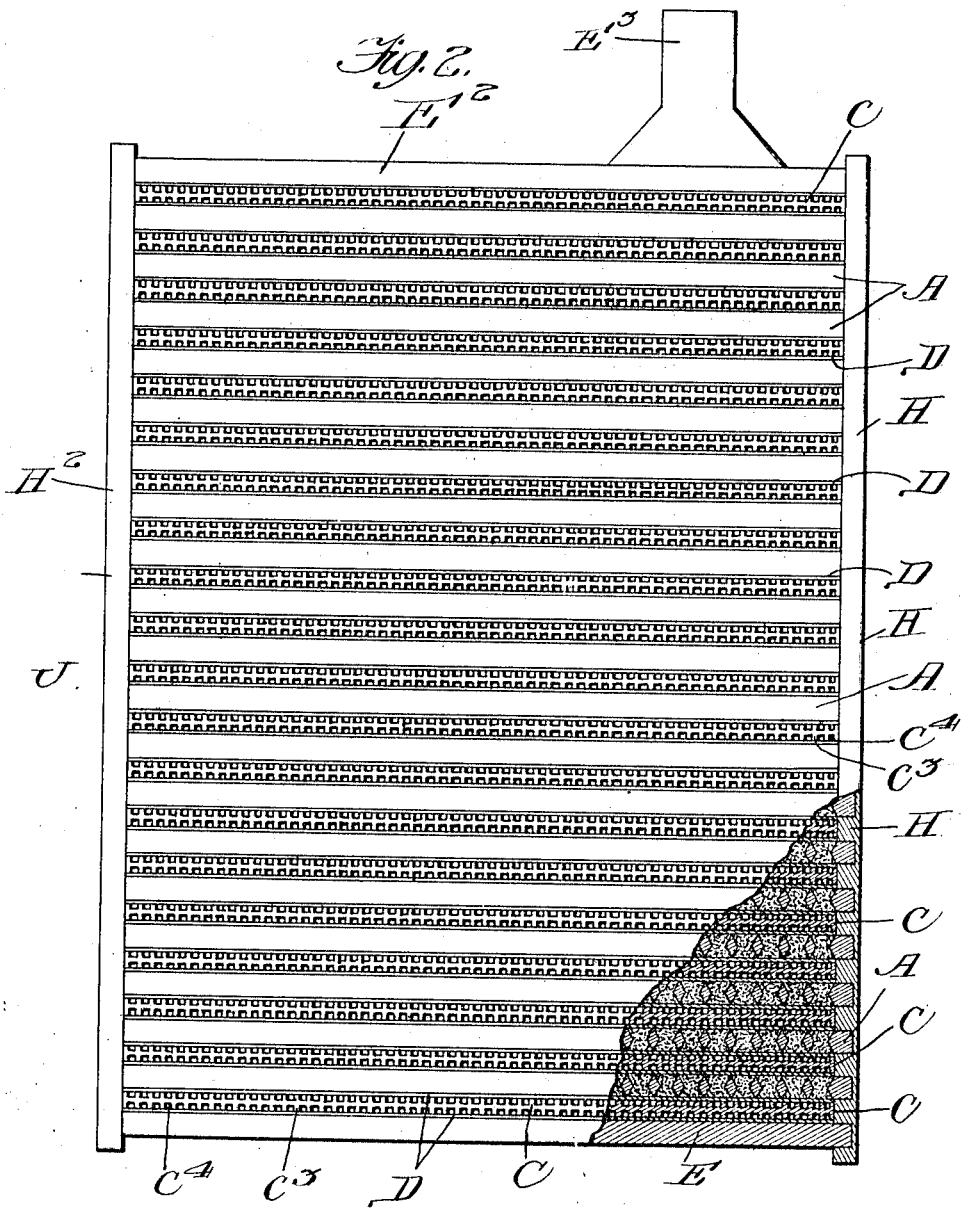

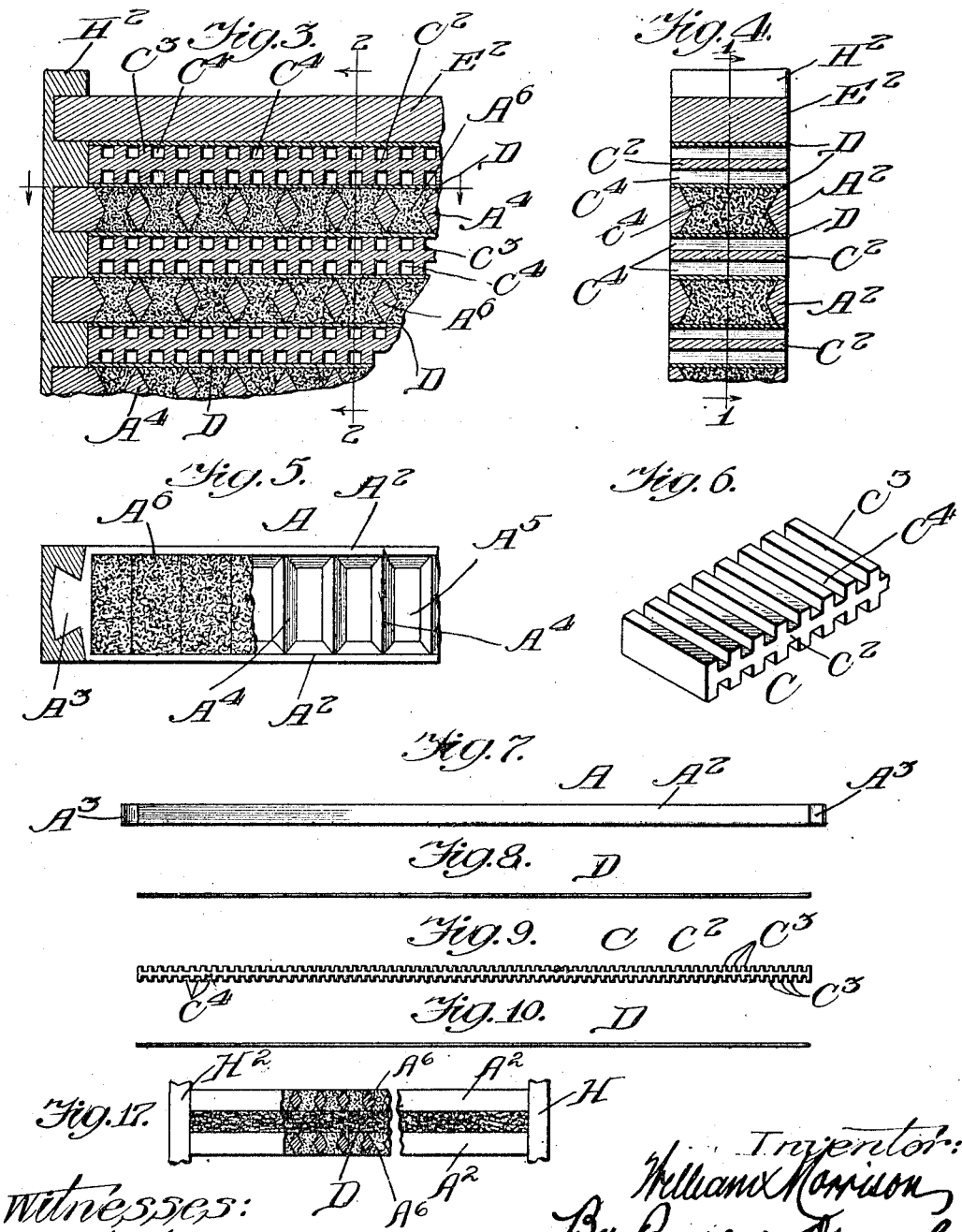

UNITED STATES PATENT OFFICE.

WILLIAM MORRISON, OF CHICAGO, ILLINOIS, ASSIGNOR TO UNIVERSAL ELECTRIC STORAGE BATTERY COMPANY, OF CHICAGO, ILLINOIS, A CORPORATION OF DELAWARE.

ELECTRIC SECONDARY BATTERY.

1,051,816.      Specification of Letters Patent.      Patented Jan. 28, 1913.

Application filed December 27, 1904, Serial No. 238,494. Renewed June 21, 1912. Serial No. 705,098.

*To all whom it may concern:*

Be it known that I, WILLIAM MORRISON, a citizen of the United States of America, and resident of Chicago, Cook county, Illinois, have invented a certain new and useful Improvement in Electric Secondary Batteries, of which the following is a specification.

In the general type of secondary battery or accumulator, in which lead is used as an active material or material to become active, the lead is usually mechanically applied to and held within and by the conducting support of the electrode or plate, or electrically formed in or on a conducting support of lead of the electrode or plate. Numerous forms of construction of this support have been devised to hold the active material in place. But notwithstanding many years of experiment, one of the great difficulties—if not the greatest difficulty—still encountered in the use of a secondary battery is its short life, resulting usually from the disintegration of the active material, which causes dislodgment from the conducting support. The ordinary form of conducting supports of the electrode or plate are made of metallic lead, or alloys of lead, and the material to become active is usually applied mechanically to either a lead support or to a support of an alloy of lead or electrically formed on or in lead supports of the electrode or support. The charge and discharge of the battery constantly tends to disintegrate the active material from the electrode or plate, more especially in the positive plate or electrode, dislodging and separating it from the support and precipitating it into the bottom of the cell. This happens more readily because the active material is mechanically applied to or electrically formed in or on the grid in such a manner as to leave an extended surface of such material exposed to the action of the electrolytic solution. For the plates, or electrodes, of each cell must be constructed and so disposed as to give the maximum freedom of circulation to the gases and solution to and within the active material, and also hold a maximum quantity of the material securely in place for a sufficient length of time to render the battery practical. And it is this necessity which has rendered it difficult to provide a support for the electrode or plate which will hold sufficient active material within itself for any length of time and yet permit the necessary freedom of circulation of the gases, and of the electrolytic solution to and within such material. To overcome this tendency to disintegration, the material to become active has been treated in such a manner as to cause it to set and harden within its support, and it has also been mechanically applied under pressure, and in the case of electrical formation the active material has been subjected to pressure after formation. But this, of course, renders the material much more dense and impervious to the penetration of the gases and the solution, so that the action is confined to the subjacent surface of the electrode or plate, thus limiting the capacity. So also this setting and hardening of the material, and the mechanical application of the material under pressure, fails to prevent the disintegration and separation of the material from its support. Therefore, in many instances, the material to become active has been applied over the surface of the electrode or support in such a way as to present a broad surface of such material, to the action of the electrolytic solution. The material being packed into or formed upon the support, so that the plate or electrode presents a side surface or face of active material to the electrolytic action, and in the charge and discharge the material is thus left free, when disintegrated, to fall away from the support. Not only is the active material disintegrated and dislodged from its support in the charge and discharge, but it is likewise affected injuriously, especially in traction work, because it is exposed to the wash of the solution and to shocks resulting from constant jar of the vehicle.

Not only has the form of support itself been the subject of patient experiment in an effort to construct it to hold the active material in place, but many ways have been devised for covering over the faces or sides of the plate, to confine and held the material in place, but these have all, in more or less degree, failed practically to accomplish the result desired. Now, it is evident that if a method of construction be provided in which a maximum quantity of active material is held in place at all times during the charge and discharge, so that no part of it can become dislodged and separated from its support, and yet afford free circulation of the gases and complete penetration of the electrolytic solution to, upon and within the active material, one of the greatest, if not the greatest, drawback to the efficient use of these accumulators will then be removed or overcome, and a battery produced having a long life and a maximum efficiency.

It is principally because of the disintegration and separation of the active material from its support that a storage battery, especially when used for traction purposes, is of such an extremely short life. Now, if the active material can be confined within and held rigidly by its support so that no part of it can possibly fall away from its support into the cell, the construction accomplishing this result permitting the necessary freedom of circulation of the electrolytic solution and the gases and affording the requisite degree of conductivity, then an electrode or plate will be produced capable of maintaining a high efficiency for a long period of time.

It is the principal object of my invention to provide a construction which shall accomplish this long desired result of confining and holding the active material against dislodgment or separation from its conducting supports and yet afford maximum conductivity and free circulation of the electrolyte and the gases.

Reference may now be had to the accompanying drawings in which—

Figure 1 is a perspective view of a battery element, the cell of which is partly broken away to disclose more particularly the electrodes and their connections, one of the connecting strips being also broken away. Fig. 2 is a side elevation of a complete electrode, the outer portion of which, at one of the lower corners, is broken away showing the construction of the parts in section. Fig. 3 is an enlarged sectional view on the line 1—1 in Fig. 4 of a portion of an electrode. Fig. 4 is a sectional view of a portion of an electrode on the line 2—2 in Fig. 3. Fig. 5 is a detailed plan view of a portion of the plate-section or unit showing a portion of the active material or material to become active therein. Fig. 6 is a perspective view of a portion of a grooved retainer holding member or spacer. Fig. 7 is a side or edge view of one of the plate-sections or units. Fig. 8 is a like view of one of the porous retainers. Fig. 9 is a like view of one of the supporting grooved retainer holding members or spacers. Fig. 10 is a like view of another porous retainer adapted to be placed on the other face of the supporting member. These several views, 7, 8, 9 and 10, show the relative positioning of the plate-sections or units, the porous retainers, and the grooved retainer holding members or spacers. Fig. 11 is a perspective view of a plate-section or unit and porous retainer covering each side thereof, one of said retainers being partly turned up in order to show the active material beneath. Fig. 12 is a plan view of a complete plate-section or unit. Fig. 13 is a plan and edge view respectively of the bottom conducting support of the electrode. Fig. 14 is a like view of the top conducting support carrying the terminal. Fig. 15 is a perspective view of a modified form of apertured retainer holding member or spacer. Fig. 16 is a perspective view of a portion of a plate-section or unit of a modified form. Fig. 17 is an edge view of a portion of two plate-sections or units with a porous retainer filling the space between them.

Having reference to Figs. 5, 11 and 12, I have shown one of these plate-sections or units designated at A, consisting of a frame $A^2$, the ends of which are provided with members $A^3$ (Fig. 12) for forming a dovetailed connection, and cross-bars $A^4$, extending from and between each side of the frame $A^2$. In Figs. 5 and 11, I have shown a portion of the material to become active disposed within the receptacles $A^6$. The grooved retainer holding member or spacer C is more clearly shown in the perspective view Fig. 6, and, as shown, consists of a central web $C^2$ with projecting ribs or teeth $C^3$ extending from each side of said web, thus forming a series of grooves $C^4$.

The porous retainer D shown in Figs. 8, 10 and 11, is preferably a strip of cellulose, which material resists chemical action to a great extent and is exceedingly porous. It is made of such a size as to cover the exposed surface of the active material within the plate-sections. To completely hold the active material the porous retainer should be made of the same size as each face of the plate-section, opposite to the face of the adjacent plate-section, so that not only is the exposed surface of the active material covered, but also the metallic portions of that face of the plate-sections as well.

The method of constructing or assembling the different parts of the electrode may be as follows: A retainer holding member or spacer C is first laid upon the bottom conducting support E (Fig. 2), the latter being of the same general design or shape as the plate-sections except, of course, that it has no cavities or receptacles for the material to become active. Or if found desirable, one of the porous retainers D may be first laid upon the said bottom conducting support.

After this, a porous retainer D is laid upon the top of the said retainer holding member. Next, a plate-section or unit A, bearing the material to become active, is laid upon the said porous retainer. When this has been done, another porous retainer D is laid upon the plate-section, and upon this another retainer holding member C. Another porous retainer D is then laid upon the retainer holding member last added to the structure, and another plate-section is then placed upon the top of the whole. In this way, the positioning of parts is continued until the plate or electrode is of sufficient size. The top conducting support $E^2$ can then be placed upon the last or uppermost retainer holding member C, it being observed that this top conducting support is similar to the bottom conducting support E, except that it is provided with a terminal $E^3$. When these various parts are thus assembled, the conducting side supports H, $H^2$, are secured to the top and bottom conducting supports, thus securely binding and holding the various parts together, and forming one complete electrode, the plate-sections of which are electrically connected and of the same polarity. It is obvious, however, that this building-up process may commence at either the top or the bottom of the plate, as may suit the convenience of different cases. This completed plate, or electrode, so constructed may be of any desired size, and may be united with any desired number of electrodes in the usual well-known manner; the said completed plates designated at J being shown thus assembled in Fig. 1, in a complete battery element.

In Fig. 15, I have shown a modified form of retainer holding members, which consists of porous material having a series or multiplicity of openings through it for the admission of the solution and gases which pass to and from the porous retainers through the porous material of the said members or spacers.

In Fig. 16, I have illustrated a modified form of the plate-section which has receptacles for the active material and which presents only one exposed surface of the active material to be covered by the porous retainers.

In Fig. 17, I have also illustrated a modified form of porous retainer which consists of porous material of a suitable character which will permit free circulation of the gases and solution, and which fills the space between the plate-sections. This form of construction may be found desirable for certain character of work.

From the foregoing description it is evident that I provide an electrode or plate for a secondary battery in which the material to become active is applied to and within the receptacles of or openings in the plate-sections, the exposed surfaces of the faces of the active material, or material to become active, being opposite to each other in the constructed plate, said faces or surfaces being completely covered or inclosed by means of the porous retainers, which are held firmly and securely in place against said faces or surfaces of the material by retainer holding members of such a character as to permit free circulation of the solution and the gases; the plate-sections themselves firmly holding the porous retainers and the apertured retainer holding members or spacers between them, all of the plate-sections in each complete electrode being electrically connected and of the same polarity.

From the foregoing description it is clearly apparent that my improved plate or electrode provides means whereby the active material is completely and entirely inclosed in each plate-section. This is accomplished by means of the porous retainers and the metallic sides of the plate-sections. The porous retainers covering the exposed surface of the active material adjacent to the opposite plate-section in each electrode and these metallic sides of the plate-sections being opposite to the adjacent electrode in a complete battery element. It is further evident that the porous retainers permit free circulation of the gases and the solution to and from the active material, and completely prevent any escape of said active material from its position within the plate-sections. The retainer holding members or spacers, provided as they are with a multiplicy of grooves or apertures, or other kinds of recesses present openings directly for the passage of the solution and gases to and from the porous retainers to permit free circulation of the gases and solution, and having numerous engaging points or a continuous or practically continuous engaging surface, also hold the porous retainers securely against the surface of the active material practically at all points, to completely prevent the escape of any of the active material. It is possible to thus hold the porous retainers at all points against the surface of the exposed active material, because the plate-sections and the porous retainers and retainer holding members or spacers between them are built up and held rigidly and solidly within and as a part of the electrode itself. It is further apparent that the constructed plate or electrode is composed of a number of plate-sections or units of the same polarity held within and by a suitable frame, which plate-sections or units each have receptacles or openings for the material to become active, or active material, and metallic sides or edges which are presented to the opposite electrodes in the completed element. Thus the edges or sides of the plate-sections or units of the completed electrode are metallic and face the opposite electrode in the completed element. And in the electrode or plate itself the surface or surfaces of the active material covered by the porous retainers of each plate-section is opposite to the surface of the adjoining plate-sections. It will also be observed that the active material of each plate-section facing one another is inclosed on that side by the porous retainers, and on the other side by the metallic edge of the plate-sections which become a part of the surface or side of the completed electrode facing the opposite electrodes of the element. Thus no portion of the active material is left exposed, the faces of the active material opposite each other in the completed electrode being covered by the porous retainers which are held between and by the plate-sections or units, thereby providing an efficient means for holding the retainers in place against the surfaces of the paste or active material and thus preventing the escape of the active material.

In the form of construction which I have described, constituting one of the embodiments of my invention, the plate-sections or units, as has been stated, in each completed electrode are electrically connected together and have the same polarity.

It is evident that in the construction described the porous retainers are placed in position between plate-sections of the same polarity in the same electrode, thus differing from that type of battery in which porous material is placed in position between separate electrodes of different polarity, in which latter type of battery the porous material soon becomes a conductor, thus electrically short-circuiting the electrodes.

In my invention it is apparent that should the porous retainers or the retainer holding members or spacers become conductors, this would have no effect upon the operation of the electrode, since the porous retainers and retainer holding members or spacers are all a part of the same electrode of one polarity.

It is evident that my improved electrode or plate may be used in couple with an electrode or plate of an entirely different construction for the negative electrode.

It is evident, therefore, that the plate as a whole has portions which bear flatwise upon the masses of paste (the material to become active) to hold the same in place. Each lead bar or unit A has its ends provided with tangs or attaching portions $A^2$ which are integrally and electrically united by the binding strips H and $H^2$. Furthermore, the plate or electrode as a whole preferably has transverse teeth $C^3$ which bear upon the porous strips D to hold the paste or material-to-become-active in place. For the broader purposes of my invention, these teeth or ribs can be of any suitable material, and can be incorporated in the plate structure in any suitable manner. It is obvious that various ways may be employed for providing the plate structure with parallel rows of teeth, and for this reason I do not limit myself to the particular method shown. In any event, the said teeth have the advantage of both holding the paste in place and affording small openings or circulation pasages between them.

Whether grooved or apertured, it will be seen that broadly considered the spacers or separators are provided with recesses, such as shown, which are both merely different forms of recesses. Each spacer and its retainers constitute a combined recessed and porous spacing and retaining means, for the purposes set forth.

Among the different features of improvement, I consider a plate provided with parallel rows of teeth for holding the paste in place and affording circulation passages an important one. A plate having parallel rows of teeth which bear upon thin strips of porous material or paste retainers, and which afford circulation passages between them, is a feature of further and special improvement. The paste is, it will be seen, arranged in a plurality of tiers or rows, with a line of teeth and, preferably, a porous retainer for each tier or row. Whether of one form or the other, the spacers provide circulation passages or openings for the electrolyte.

While I do not limit myself to the exact construction shown and described, it will be understood that my invention is, however, limited to storage batteries of the Faure type.

It has been stated that the spacers can be of porous material. They can also be made of hard rubber or other suitable material. If porous, they can be of any good and firm fibrous material, such as cellulose, wood or other vegetable fiber.

What I claim as my invention is:

1. A secondary electric battery having electrodes or plates, at least one of which consists of a plurality of plate-sections, active material or material to become active carried by said plate-sections, the face or faces of which material exposed to the action of the electrolyte being opposite to the adjacent plate-section or sections in the same plate or electrode, and which sections are all electrically connected to constitute an electrode of one polarity, porous retainers between said plate-sections fully covering and retaining in place all parts of the active material, and a suitable electrolyte, together with another electrode or electrodes of an opposite polarity.

2. An electrode or plate for secondary batteries, which comprises a number metal plate-sections having recesses for the active material or material-to-become-active, porous retainers between said plate-sections covering the exposed surface of the active material or material-to-become-active, the said surface thus fully covered by the porous retainers of each plate-section being opposite the adjacent plate-sections of said plate or electrode, said plate-sections being electrically connected together and constituting an electrode or plate of one polarity.

3. An electric secondary battery at least one of the electrodes of which consists of a number of plate-sections having a recess for the active material or material-to-become-active, porous retainers between said plate-sections fully covering the exposed surface or surfaces or face or faces of the active material or material-to-become-active, the said face or faces or exposed surface or surfaces thus fully covered by the porous retainers of each plate-section being opposite the adjacent plate-section in the same plate or electrode, the said plate-sections being electrically connected together to constitute an electrode or plate of one polarity, another plate or electrode of a different polarity, and recessed means for holding the porous retainers in place and permitting free circulation of the gases and electrolyte to or from the porous retainers between the plate-sections, together with a suitable electrolyte.

4. A secondary electric battery having electrodes or plates at least one of which consists of a plurality of plate-sections, active material or material-to-become-active carried by said plate-sections, the faces of which material exposed to the action of the electrolyte being opposite to the adjacent plate sections in the same plate or electrode, and which sections are all electrically connected and constituting an electrode of one polarity, porous retainers between said plate-sections serving to retain in place and fully cover that portion of the active material opposite the adjacent plate-sections of the same plate or electrode, said plate-sections having metallic edges filling the space between the porous retainers along the surfaces of the completed electrode, and serving to retain in place that portion of the active material within the plate-sections opposite to the adjacent electrode, and a suitable electrolyte, together with other electrodes or plates of an opposite polarity.

5. An electric secondary battery having a plurality of electrodes or plates at least one of which consists of a plurality of plate-sections, active material or material-to-become-active carried by said plate-sections, said plate-sections having metallic edges which face the adjacent electrode or plate or electrodes or plates, and flat porous retainers interposed between said plate-sections, said plate-sections being electrically connected and providing an electrode of one polarity, together with a suitable electrolyte.

6. An electric secondary battery consisting of a plurality of electrodes or plates, at least one of which consists of a plurality of plate-sections, active material or material-to-become-active carried by said plate-sections, said plate-sections having metallic edges which face the adjacent electrode or electrodes, porous retainers between said plate-sections fully covering the active material, said plate-sections being electrically connected and providing an electrode of one polarity, and recessed means for permitting free circulation of the gases and solution to or from the porous retainers between the plate-sections adapted to hold the same in place, together with a suitable electrolyte, said recessed means being separate and distinct from said plate-sections.

7. An electrode or plate for secondary batteries built up of a plurality of plate-sections, active material or material-to-become-active carried by said plate-sections, the exposed surface or surfaces of said active material facing each other in the completed electrode, porous retainers covering said exposed surface or surfaces, and metallic edges of said plate-sections covering the active material along the side surfaces of the completed electrode, which said metallic edges constitute that part of the side surfaces of the completed electrode between the porous retainers, said plate-sections being electrically connected to constitute one electrode of one polarity.

8. An electrode or plate for secondary batteries built up of a plurality of plate-sections, active material or material-to-become-active carried by said plate-sections, the exposed surfaces of said active material facing each other in the completed electrode or plate, porous retainers covering said exposed surfaces, and metallic edges of said plate-sections covering the active material along the side surfaces of the completed electrode, which said metallic edges constitute the side surfaces of the completed electrode between the porous retainers, and a member having passages, arranged between the porous retainers, said plate-sections being electrically connected to constitute one electrode of one polarity.

9. An electrode or plate for secondary batteries which consists of a plurality of plate-sections, active material or material-to-become-active within or on said plate-sections, the exposed surfaces of said active material facing each other in the completed electrode or plate, porous retainers covering said exposed surfaces between said plate-sections, grooved strips between said porous retainers for permitting free circulation of the gases and solution to or from the porous retainers, and side connectors together with bottom and top connectors for holding the plate-sections in place and electrically connecting them together, said top and bottom connectors and plate-sections also holding the porous retainers and grooved strips between them.

10. An electrode or plate for secondary batteries built up of a plurality of plate-sections, active material or material-to-become-active carried by said plate-sections, the exposed surface or surfaces of said active material being opposite to the adjacent plate-sections in the completed electrode or plate, porous retainers fully covering said exposed surfaces, the metallic edges of said plate-sections covering the active material along the side surfaces of the completed electrode, which said metallic edges constitute the side surfaces of the completed electrode between the porous retainers, and recessed means for allowing the circulation of the electrolyte and gases to and from the porous retainer or retainers, adapted to bear upon and hold the same in place, said plate-sections being electrically connected to constitute one electrode of one polarity.

11. An electrode or plate for secondary batteries which consists of a plurality of plate-sections, active material or material-to-become-active carried by said plate-sections, the exposed surface or surfaces of said active material being opposite to the adjacent plate-section in the completed electrode or plate, porous retainers covering said exposed surfaces between said plate-sections, grooved strips between said porous retainers for permitting free circulation of the gases and solution to or from the porous retainers, and side connectors together with bottom and top connectors for holding the plate-sections in place and electrically connecting them together, said top and bottom connectors and plate-sections also holding the porous retainers and grooved strips between them.

12. An electrode or plate for secondary batteries which consists of a plurality of plate-sections, active material or material-to-become-active carried by said plate-sections, the exposed surfaces of said active material facing each other in the completed electrode or plate, porous retainers covering said exposed surfaces between said plate-sections, a recessed member between said porous retainers for permitting free circulation of the gases and solution to or from the porous retainers, and side connectors, together with bottom and top connectors for holding the plate-sections in place and electrically connecting them together, said top and bottom connectors and plate-sections also holding the porous retainers and recessed members between them.

13. An electric secondary battery consisting of a suitable electrolyte and a plurality of electrodes or plates, at least one of which consists of a plurality of plate-sections, active material or material-to-become-active carried by said plate-sections, said plate-sections having metallic edges which face the adjacent electrode or electrodes, recessed spacing means and porous retaining means between said plate-sections, the recesses in said spacing means extending entirely through the plate, permitting free circulation of the gases and electrolyte, and fully covering the active material, said plate-sections being electrically connected and providing an electrode of one polarity.

14. An electrode for secondary batteries, consisting of a plurality of plate-sections, active material or material-to-become active carried by said plate-sections, said plate-sections having metallic edges, recessed spacing means and porous retaining means between said plate-sections, fully covering the active material thereof, the recesses in said spacing means extending entirely through the plate, said metallic edges together with the interposed edges of the spacing and retaining means constituting the side surfaces of the electrode or plate, said plate-sections being electrically connected and providing an electrode of one polarity.

15. An electrode consisting of spaced electrically-connected units, each unit comprising a support and active material held thereby, said active material extending substantially entirely through the units, and porous spacers between adjacent units, each porous spacer also having definite passages for the electrolyte, said passages extending entirely through the plate.

16. An electrode consisting of spaced electrically-connected units, each unit comprising a support and active material carried thereby, and transversely and closely grooved spacers between adjacent units, the grooves of the spacers extending entirely through the plate.

17. An electrode consisting of spaced electrically-connected units, each unit comprising a support and active material carried thereby, porous retainers overlying the exposed active material of each unit, and spacers between adjacent retainers.

18. An electrode consisting of spaced electrically-connected units, each unit comprising a support and active material carried thereby, porous retainers overlying the exposed active material of each unit, and spacers between adjacent retainers, each spacer having passages for the electrolyte.

19. An electrode consisting of spaced electrically-connected units, each unit comprising a support and active material carried thereby, porous retainers overlying the exposed active material of each unit, and grooved spacers between adjacent retainers 20. In a storage battery, an electrode comprising a plurality of spaced electrically connected units each provided with active material, and porous means interposed and clamped between the said units and entirely covering the said active material, thereby preventing dislodgment of any part thereof.

21. In a storage battery, an electrode comprising spaced electrically-connected units arranged one above the other, and each provided with upwardly facing active material, and porous means interposed and clamped between said units and entirely covering said active material, thereby preventing dislodgment of any part thereof.

22. In a storage battery, an electrode comprising spaced electrically-connected units each provided with active material, and thin sheets of porous material interposed between the units and covering the active material, said sheets being held in place by recessed means which give the electrode a reticulated character.

23. In a storage battery plate, the combination of paste and a plurality of rows of closely arranged teeth for holding the paste in the plate and affording circulation passages extending from one side of the plate to the other, said teeth being directed toward the paste.

24. A secondary battery plate comprising a series of units filled with active material, a series of porous retainers completely covering the active material, side bars uniting said units, and top and bottom bars integral with said side bars.

25. A secondary battery plate comprising a series of units filled with active material, a series of porous retainers completely covering the top and bottom of said active material, side bars uniting said units and top and bottom bars integral with said side bars.

26. A storage battery plate comprising a plurality of parallel chambered metal bars containing paste, flat strips of porous material interposed and clamped between said bars, said porous strips fully covering and holding the said paste in place, and metal binding strips applied to the ends of said bars to electrically and integrally unite the same, the plate having small openings or circulation passages extending entirely through the same at points between the bars.

27. A storage battery plate comprising a plurality of parallel chambered metal bars containing paste, covering strips of porous material laid flatwise against the said paste to hold the same in place, and metal binding strips applied to the ends of said bars to electrically and integrally unite the same, the said plate having teeth to hold the porous covering strips in place and provide circulation passages.

28. A storage battery plate comprising a plurality of lead bars or units, each said bar containing paste and having tangs or attaching portions at its opposite ends, lead binding strips applied to said tangs or attaching portions to electrically and integrally unite the said bars or units, and thin porous strips applied flatwise to the paste, the plate having teeth bearing against said strips to hold the paste in place.

29. A storage battery plate comprising a plurality of lead bars or units each containing paste, porous strips lying against the paste, and lead binding strips applied to the ends of said bars or units to electrically and rigidly unite the same, the plate having a plurality of parallel rows of teeth, each row of teeth bearing upon one of said porous strips to hold the paste in place, and the said teeth affording circulation passages between them from one side of said plate to the other.

30. In a storage battery plate, the combination of a plurality of tiers of paste, a porous retainer for each tier of paste, and a plurality of rows of teeth, one row for each retainer, adapted to hold the same in place.

31. In a storage battery plate, the combination of parallel separated layers of paste, metal plate-sections for holding said paste, means for electrically and integrally uniting the ends of said sections, and porous strips interposed between and clamped flatwise upon and fully covering the said layers of paste.

32. In a storage battery plate, the combination of parallel separated layers of paste, parallel rows of teeth suitably incorporated in the plate structure, one row of teeth for each layer of paste, and porous strips interposed between said layers of paste and rows of teeth, the said teeth affording passages between them, giving the plate a reticulated character.

33. A storage battery plate comprising a plurality of lead plate-sections, paste in said plate-sections, constituting the material-to-become-active, porous retaining strips applied to and fully covering the paste, lead side strips connecting together the ends of said plate-sections, said porous strips held firmly against the paste.

34. A storage battery plate comprising a plurality of lead plate-sections, paste in said plate-sections, constituting the material-to-become-active, porous means interposed and clamped between the plate-sections firmly engaging and covering the said paste, and lead side strips connecting together the ends of said plate-sections.

35. A storage battery plate comprising a plurality of lead plate-sections, hardened paste in said plate-sections constituting the material to become active, porous retaining strips applied to and fully covering the paste, lead side strips connecting together the ends of said plate-sections, said porous strips held firmly against the paste.

36. A storage battery plate comprising a plurality of lead plate-sections, hardened paste in said plate-sections, constituting the material to become active, porous means interposed and clamped between the plate-sections firmly engaging and covering the said paste, and lead side strips connecting together the ends of said plate-sections.

Signed by me at Chicago, Cook county, Illinois, this 24th day of December 1904.

WILLIAM MORRISON.

Witnesses:
 CHAS. C. BULKLEY,
 CLARENCE M. THORNE

Copies of this patent may be obtained for five cents each, by addressing the "Commissioner of Patents, Washington, D. C."